United States Patent [19]

Jones

[11] 3,899,767

[45] Aug. 12, 1975

[54] IMAGING SYSTEM

[75] Inventor: Charles H. Jones, Murrysville, Pa.

[73] Assignee: Westinghouse Electric Corporation, Pittsburgh, Pa.

[22] Filed: Nov. 15, 1973

[21] Appl. No.: 416,326

[52] U.S. Cl.............. 340/3 R; 340/5 MP; 340/6 R; 343/17; 343/113 R
[51] Int. Cl.².... G01S 9/66; G01S 7/56; G01S 3/80
[58] Field of Search ........ 340/6 R, 6 M, 16 R, 3 R, 340/5 MP; 343/113 R, 17

[56] References Cited
UNITED STATES PATENTS

| 2,898,589 | 8/1959 | Abbott | 340/6 R X |
|---|---|---|---|
| 3,086,195 | 4/1963 | Halliday | 340/16 R |
| 3,278,891 | 10/1966 | Cowdery | 340/6 R |
| 3,389,373 | 6/1968 | Angeloff et al. | 340/16 R X |
| 3,685,008 | 8/1972 | Bhuta et al. | 340/3 R |

Primary Examiner—Richard A. Farley
Attorney, Agent, or Firm—D. Schron

[57] ABSTRACT

Acoustic energy generated at, or reflected from, a specific area in the ocean is collected by an array of n transducer elements. The signals from these elements are amplified, processed and fed to a scaled down set of n transmitting transducer elements similarly shaped and similarly positioned relative to each other. These transmitting elements are located in one region of a tank of liquid and an array of detectors for monitoring the sonic energy distribution is located in another region of the tank. The received signals are processed in such a way that the acoustic energy distribution in the tank in the vicinity of the detector array is similar to that emanating from the target area in the ocean. No sonic lens needs to be used in the tank.

28 Claims, 43 Drawing Figures

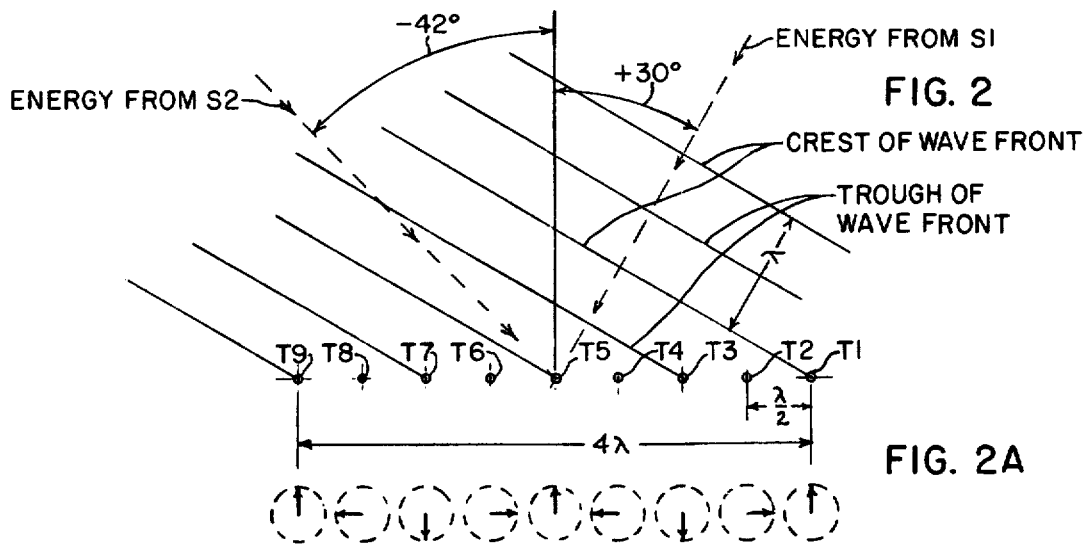
FIG. 2
FIG. 2A
FIG. 2B
FIG. 2C
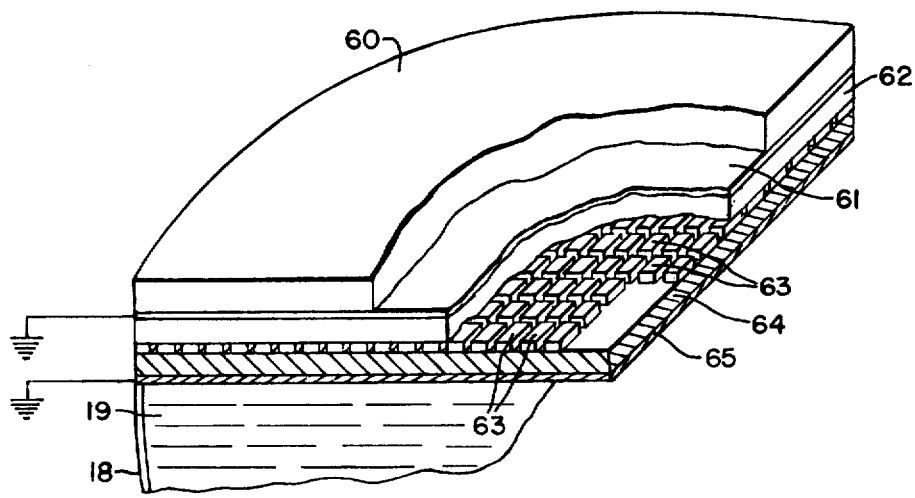
FIG. 8

PATENTED AUG 1 2 1975　　3,899,767

SHEET 6

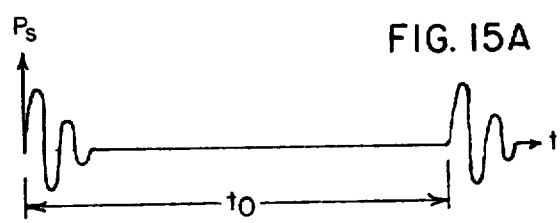
FIG. 15A
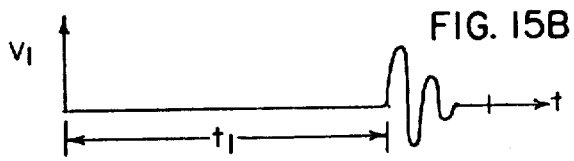
FIG. 15B
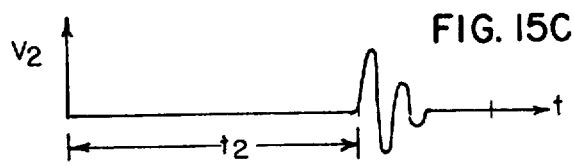
FIG. 15C
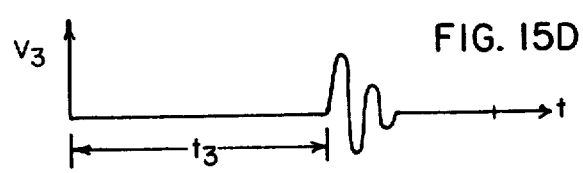
FIG. 15D
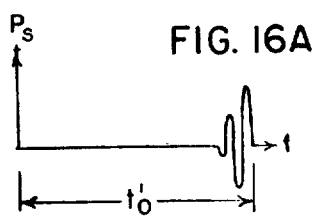
FIG. 16A
FIG. 16B
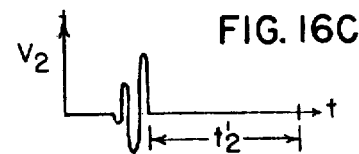
FIG. 16C
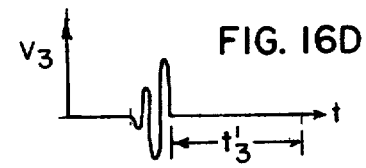
FIG. 16D
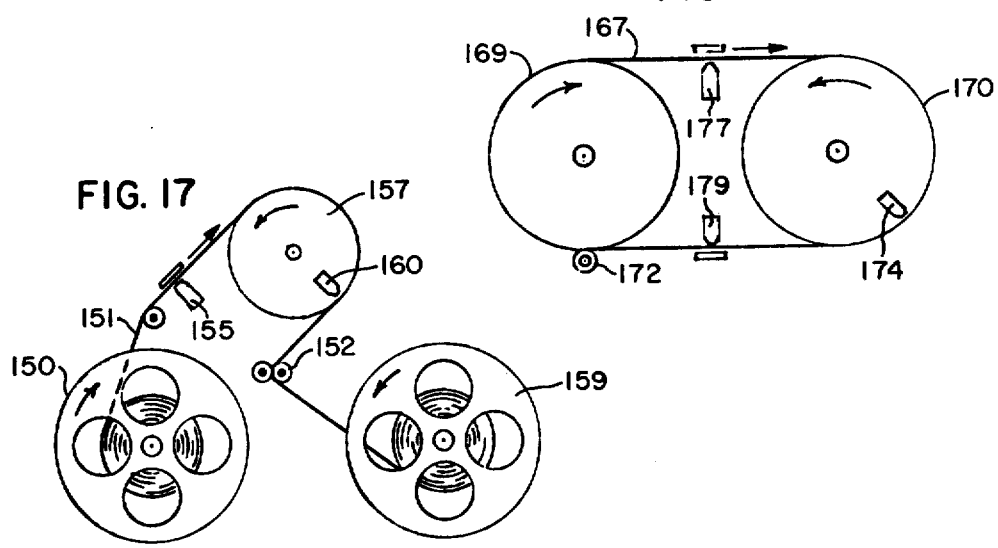
FIG. 17
FIG. 18

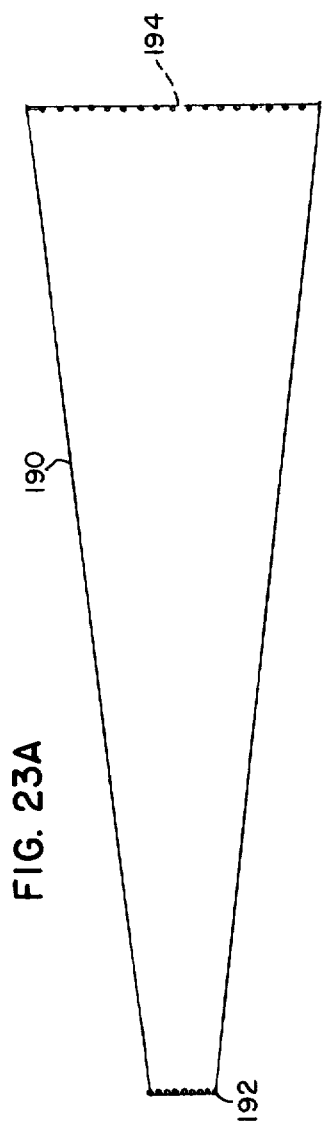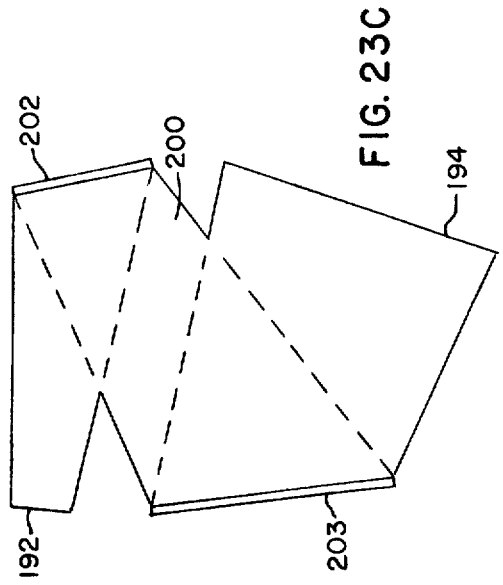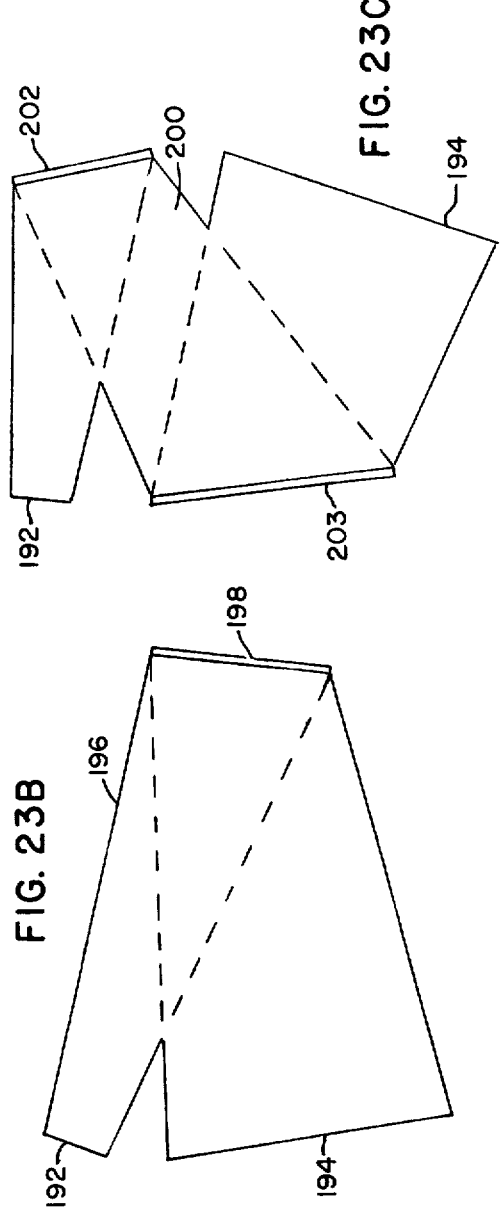

3,899,767

IMAGING SYSTEM

BACKGROUND OF THE INVENTION

1. Field of the Invention

Acoustic or electromagnetic imaging and target detection systems.

2. Description of the Prior Art

To view a target area, various types of imaging systems exist which utilize an electrical or a mechanical scanning operation. In order to avoid the complications associated with scanning type systems, there have been proposed imaging systems utilizing an acoustic lens for focusing energy onto an array of receiving transducers. At certain frequencies, such systems are practical. However, at frequencies below, for example, one megahertz conventional lens systems become bulky. For example, an array 2 feet in diameter using an acoustic lens 2 feet in diametr would likely have a space between the lens and the array of 2 feet or more. Consequently, a volume greater than 6 cubic feet would be required, in addition to the volume occupied by the transducers, amplifiers and other circuits. In addition, for various situations compensation means must be provided since the lens parameters vary with varying ambient temperatures.

The present invention provides for an imaging system particularly well adapted for underwater use which completely eliminates the need for scanning and lens systems.

SUMMARY OF THE INVENTION

The present invention obtains a visual image of objects in a target area by utilization of an array of receiving elements which receive energy from the area under investigation. In response to this energy, which may emanate or be reflected from the target area, the elements provide output signals each having an instantaneous voltage as a function of time.

Signal processing means convert the set of received signals to a set of new waveforms which are so constituted that when they are applied to the transmitting array of transducers located in a tank of liquid, the energy distribution in another part of the tank is a scaled replica of the energy distribution reflected from the area under investigation. A sonic to light image converter is used to provide a display of the energy distribution in the tank in the region of interest. In order to keep this analog tank physically small, the transmitting elements are generally designed to operate at smaller wavelengths (higher frequencies) than the receiving elements.

BRIEF DESCRIPTION OF THE DRAWINGS

FIG. 2 illustrates the reception of acoustic energy from two different targets by a plurality of transducers disposed at a distance from the targets;

FIG. 2A illustrates the vector magitudes and phases of the signals produced by the plurality of transducers in response to energy from a first target;

FIG. 2B illustrates the vector magnitudes and phases of the signals produced by the plurality of transducers in response to energy from a second target;

FIG. 2C illustrates the vector sum of the transducer signals illustrated in FIGS. 2A and 2B;

FIG. 8 illustrates one embodiment of a display device which may be utilized herein;

FIGS. 15A through 15D represent typical waveforms prior to processing, and

FIGS. 16A through 16D represent typical waveforms after signal processing by the apparatus of FIG. 14;

FIGS. 17 and 18 illustrate two different methods utilizing magnetic tape for the processing of signals by the apparatus of FIG. 14;

FIGS. 23A through 23C illustrate three different analog tank configurations;

DESCRIPTION OF THE PREFERRED EMBODIMENTS

Figure 1:
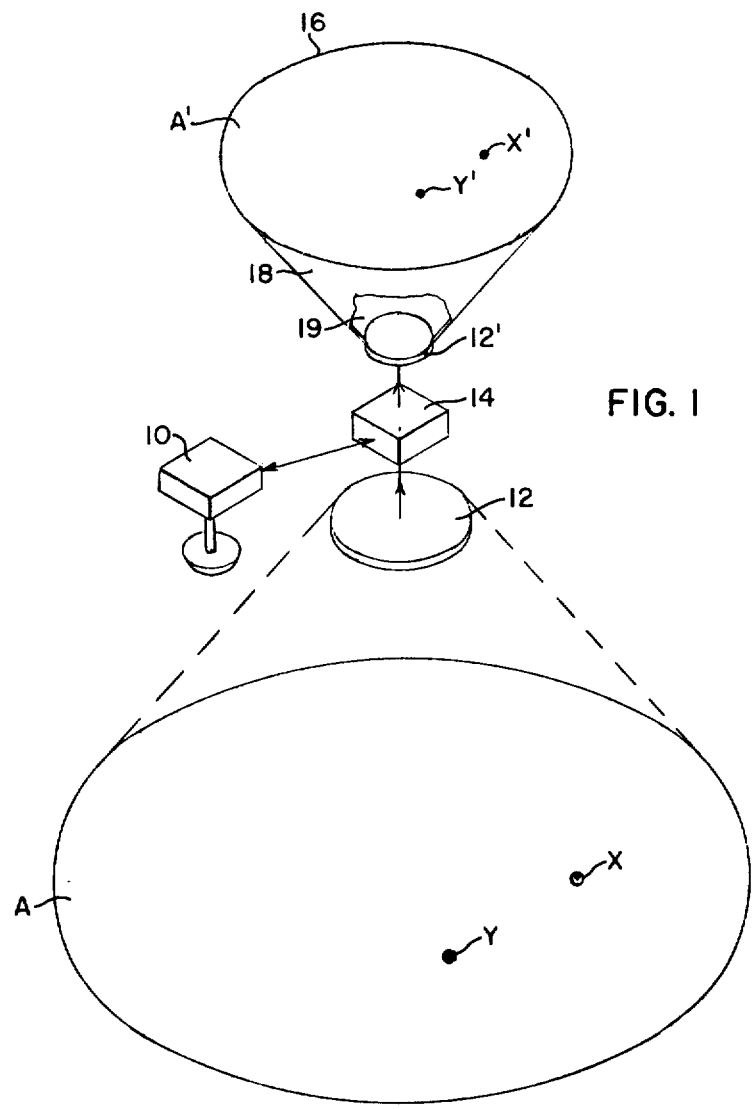
FIG. 1 illustrates one underwater embodiment of the present invention.

FIG. 1 serves to illustrate an embodiment of the invention for underwater use, the principles of which are also applicable to electromagnetic energy systems or combinations of acoustic and electromagnetic systems.

Transmitter means 10 transmits an acoustic signal of a frequency $f$ toward a target area A under investigation. Reflected energy in the form of acoustic returns are received by a plurality of transducers in an array 12. In response to the received acoustic energy each transducer of the array will provide a respective output signal of a certain amplitude and phase. These signals herein termed first output signals are provided to the signal processing circuits 14 which function, in one embodiment, to change the phase of each signal and to proportionally scale the amplitude and frequency thereof to provide respective second output signals.

A second array, of transmitting transducers 12', is provided, each transducer of the array being adapted to receive a respective second output signal from the signal processing circuits 14 for transmitting the energy represented thereby to an output means including a display 16 at image converter area A'. The array 12' and the display 16 may be situated at opposite ends of an analog tank 18 which contains an acoustic transmission medium 19 therein.

The array 12' is similar to array 12, except that it is reduced in size by some scale factor, the transducers in array 12 point toward the target area A and those in array 12' point toward image converter area A'. Both the size and location of the transducer elements in array 12' are scaled relative to those transducer elements in array 12.

In order to basically explain the operation, let it be assumed that points X and Y are two point reflectors of acoustic energy of frequency $f$ in the target area. The reflected acoustic energy is received by the transducers of array 12 and the respective output signals provided thereby are fed to the transmitting transducers of the array 12' after signal processing which changes each signal's phase to a corresponding negative phase, increases the amplitude of each signal, and increases the frequency of each signal. By scaling up the frequency by a certain scaling factor S, (the wavelength accordingly would be scaled down by that same factor S), the dimensions of the analog tank may be made relatively small. The array 12' transmits an acoustic pattern with the collective transmission of all of the transducers of the array producing points of increased acoustic energy, said points being designated X' and Y' on target area A', corresponding to the points X and Y of the target area A. A better understanding of the operation of the present invention may be had by reference to FIGS. 2 and 2A through 2C illustrating various basic vector concepts.

In FIG. 2, there is illustrated a row of receiving transducers designated T1 through T9 with the spacing between transducers being approximately one-half wavelength ($\lambda/2$). Acoustic energy from a first point reflector S1 impinges upon the array at a certain angle 30° with respect to the zenith. Assuming the incoming acoustic energy is of frequency $f$, there is illustrated several crests and troughs of the wave. With the particular wavelength and the spacing of the transducers as illustrated, FIG. 2 illustrates that at an instant of time, a crest will be impinging upon transducers T1, T5 and T9 while a trough is impinging upon transducers T3 and T7. The vector phases of the signals thus produced by the respective transducers are illustrated directly underneath the transducers in FIG. 2A. Since the array of transducers can be considered to be at approximately the same distance from S1, each transducer will provide the same magnitude output signal however, the phases may be different as illustrated in FIG. 2A.

Consider now energy emanating from a second point reflector S2 impinging upon the array at an angle of −42° with respect to the zenith. For clarity the crests and troughs of this latter energy have not been illustrated although the wavelength is the same as the energy emanating from S1. Assuming additionally that the magnitude of the energy is less than that of S1, the respective transducers in response to the energy from S2 will provide output signals the magnitude and phases of which are illustrated directly under the transducers in FIG. 2B.

The actual signal produced by each of the transducers as a result of energy from S1 and S2 may be seen directly under the transducers in FIG. 2C, each vector representing the resultant, or vector sum of the previous two signals above it.

Figure 3:
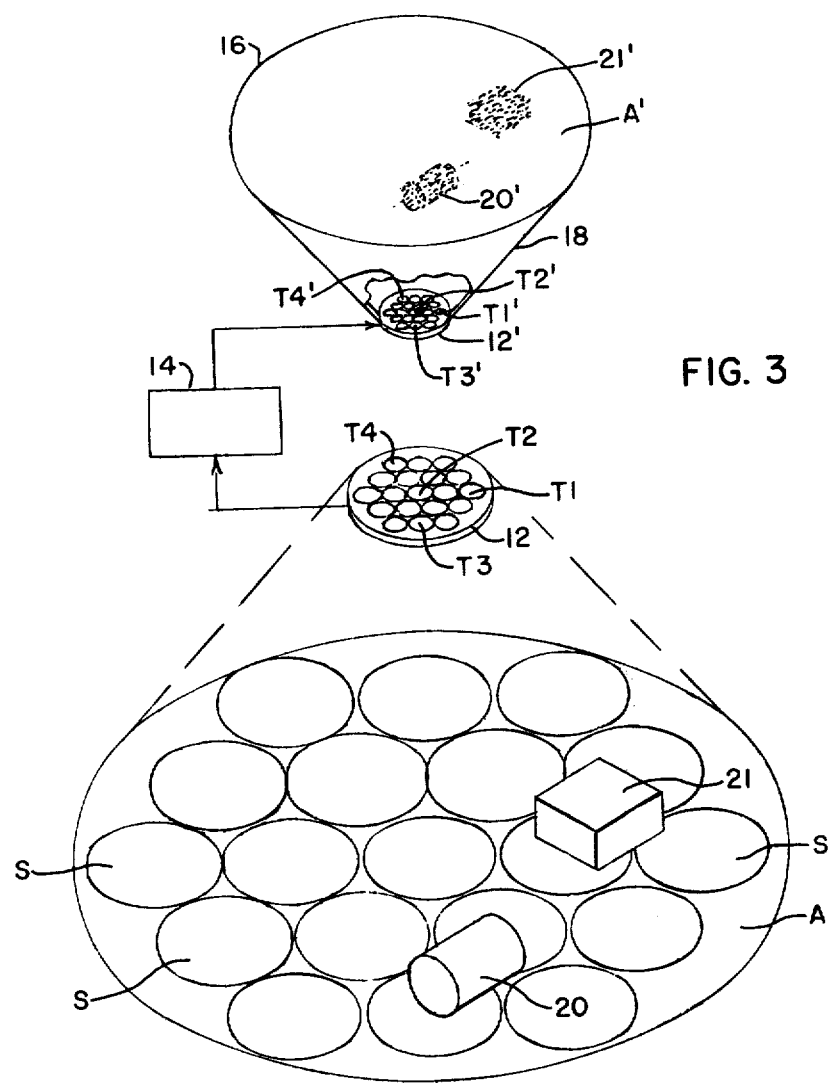
FIG. 3 is a somewhat more detailed view of FIG. 1.

Referring now to FIG. 3, it is seen that the array 12 is made up of a plurality of transducers four of which have been designated T1 to T4. The transducers of the array 12' are a scaled replica of the transducers of the array 12 both in size and position as can be seen by examining transducers T1' through T4' of array 12' directly corresponding to transducers T1 to T4 of array 12.

Each individual transducer of array 12 substantially looks at the entire area A. The entire array can produce a small beam so as to look at one small area $s$, so that, depending upon the phasing of all the transducers of the array 12, any area s within a total area A may be examined.

In some applications, it is desirable to achieve a resolution that is smaller than the size of the receiving array. When this is the case, the target area can be said to be in the near field of the array. This region is also called the Fresnel region. It extends from the face of the array out to a distance of about $2D^2/\lambda$, where D is the diameter of the array and $\lambda$ is the wavelength in water of the acoustic signal. When the resolution is larger than the size of the array, then the target area is said to be in the far field or Fraunhofer region.

In far field imaging a flat array is very satisfactory. However, in near field imaging, a preferred geometry is a concave shaped array. The best surface shape for such an array is a segment of a spherical surface having a radius that is equal to the range of the target area. A preferred boundary shape for such an array is round when uniform resolution is required in all directions. However, space or constructional limitations may dictate an octagonal, hexagonal, square or rectangular shape. The individual transducers in the array may be round, octagonal, hexagonal, square or rectangular. The diameter or size of these elements should be such that they each have a beam width that is equal to the target area. The smaller the target area, the larger the elements can be and the fewer the elements that will be required in a given size array. The advantages therefore of a concave geometry for near field imaging is that it requires fewer elements than a flat array. If such concave array is used for reception, then a similar concave array should also be used for the scaled transmitting array 12' in the analog tank 18.

Figures 4, 5:
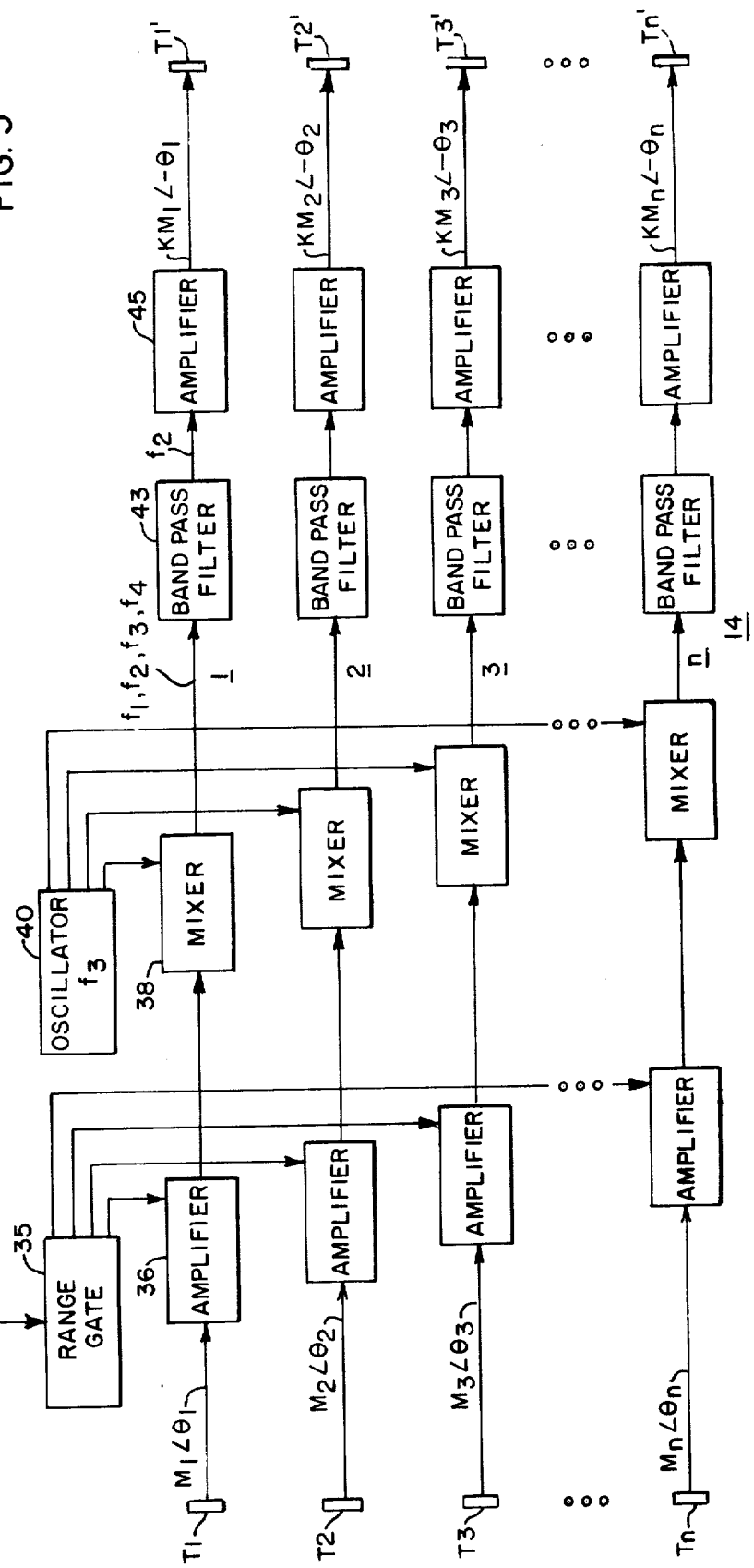
FIG. 4 illustrates one embodiment of a signal processing means which can be utilized in the present invention.
FIG. 5 is a graph illustrating the frequencies produced by a typical mixer of FIG. 4.
Figure 6A:
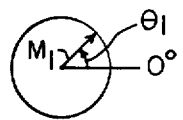
FIGS. 6A to 6D are vector representations of the signals before processing by the apparatus of FIG. 4.
Figure 7A:
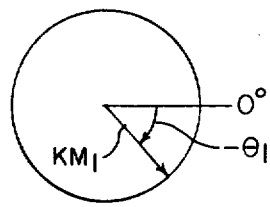
FIGS. 7A through 7D are the equivalent vectors after signal processing.
Figure 6B:
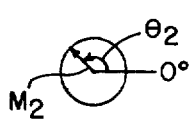
Figure 7B:
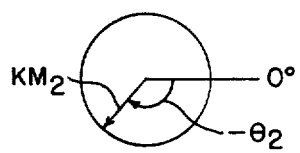
Figure 6C:
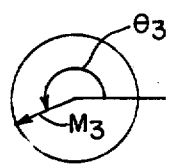
Figure 7C:
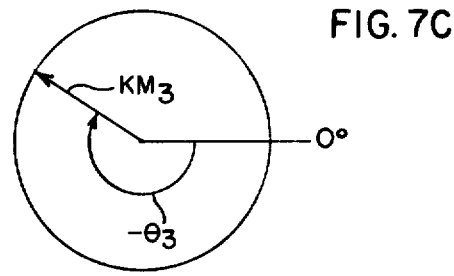
Figure 6D:
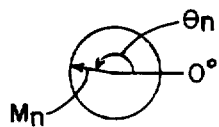
Figure 7D:
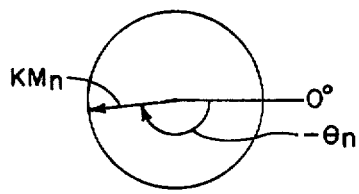

The key to the elimination of any sort of a lens system is in the processing of the signals of the apparatus and to this end reference is made to FIG. 4 which illustrates one arrangement which may be utilized. The signal processing means 14 includes a plurality of identical channels 1, 2, 3, . . . n, each channel to receive the respective output signals from transducers T1, T2, T3, . . . Tn, these signals being designated by a magnitude $M_1$, $M_2$, $M_3$, . . . $M_n$ at respective phase angles $\theta_1$, $\theta_2$, $\theta_3$ . . . $\theta_n$, all of these signals being of the frequency $f_1$. The vector representation of these first output signals are respectively illustrated in FIGS. 6A through 6D.

These signals are provided by the transducers as a result of reflected acoustic energy from the target area projected by the transmitter means 10 which includes the pulse generator 30, controlling the pulse modulator 31, which governs the pulse duration of the signal supplied to transmitting transducer 33 from transmitter 32.

In order to limit the returns to a certain distance with respect to the receiving apparatus, there may be provided a range gate circuit 35 operable to turn on the amplifiers of the channels when returns from the range of interest should be present.

Taking channel 1 as exemplary, the output signal from transducer T1 is amplified by amplifier 36 and provided to the mixer 38 which also receives the output signal of frequency $f_3$ from the oscillator 40. The result of this operation is illustrated in FIG. 5 wherein the vertical axis represents amplitude and the horizontal axis represents frequency.

The frequency of the signal from the amplifier 36 is $f_1$ and the frequency of the oscillator 40 is $f_3$. The operation of the mixer 38 is such as to provide two additional frequencies $f_2$ and $f_4$ where $f_2 = f_3 - f_1$ and $f_4 = (f_3 + f_1)$. In addition, the phase of the $f_4$ signal will be the same as the $f_1$ signal whereas the phase of the $f_2$ signal will be the negative, or conjugate thereof. Accordingly, the output of the mixer ($f_1, f_2, f_3$ and $f_4$) is filtered by the bandpass filter 43 to extract only the $f_2$ signal which has the negative phase angle. This signal is amplified in amplifier 45 resulting in an output signal of $KM_1$, with a phase angle of $-\theta_1$. It is seen that the second output signal which is provided to the transducer T1' is proportional in amplitude to the corresponding first output signal $M_1$, and has a phase $-\theta_1$, that is opposite in sign to the phase $\theta_1$, of the corresponding first output signal.

The frequency ($f_2$) of the signal provided to T1' is greater than the frequency ($f_1$) of the signal provided by transducer T1 by a chosen factor of S determined by the oscillator frequency ($f_3$) and accordingly, all of the dimensions associated with the analog tank are scaled down by a factor S relative to the dimensions of the array 12 and target area A (FIG. 1).

In a similar manner, the output signals from all of the other transducers T2 to Tn are identically processed in their respective channels such that the energy provided by transducers T1' to Tn' will be focused at positions on the display corresponding to objects in the target area. The vector representation of these second output signals are respectively illustrated in FIGS. 7A through 7D for the set of input signals illustrated in FIGS. 6A through 6D.

A variety of methods can be used to convert the sonic energy distribution in the analog tank to a visible display. For example, the image converter may utilize a single detector element, a line of elements, or a two or three dimensional array of such elements. The actual display may utilize a recording medium such as a light sensitive, heat sensitive, current sensitive, or electron sensitive film, magnetic or punched tape.

If the array of receiving transducers is stationary relative to the target area, then the energy distribution in the tank will remain constant so that it may be practical to scan a small single detector element in the tank over the area of interest to monitor the sonic image. If a row or set of detector elements is used, then the area of interest can be swept out more rapidly. If a complete array of detector elements are utilized then no mechanical scanning is required and the image can be detected very quickly. The output from each detector can be amplified, processed, displayed and/or recorded. If a remote display or recorder is utilized, it is often desirable to sample signals from each of the detectors in rapid sequence rather than to employ a large number of parallel channels. Such signals can be recorded in a variety of ways as previously noted. If no permanent record is required, the detector signal can be fed to the gun of a cathode ray tube to intensity modulate the flow of electrons to the output phosphor screen, as the electron beam is swept across the face of the tube with suitable signals applied to the two deflection coils. In applications where a local display is satisfactory, an array of light emitting sources may be utilized and to this end, reference is made to FIG. 8 illustrating one such output display.

A sheet of glass 60 is coated with a transparent conductive coating such as a tin oxide 61. Adjacent to this is an electroluminescent layer of phosphor 62. On the other side of this phosphor is an array of conducting areas 63 each equal to one picture element in size and insulated from adjacent elements. A thin sheet of electrostrictive material such as barium titanate 64 is in contact with all of the conducting islands. The other side of the barium titanate sheet may be coated with a conductor 65 or the medium 19 could be a fluid with impurities added to make it a reasonably good conductor.

In operation, a sonic pattern on the barium titanate 64 produces a corresponding voltage pattern on the mosaic of conductors 63. This same voltage pattern appears across all of the electroluminescent elemental areas above the mosaic to produce a light pattern that is similar to the sound pattern.

Figure 9:
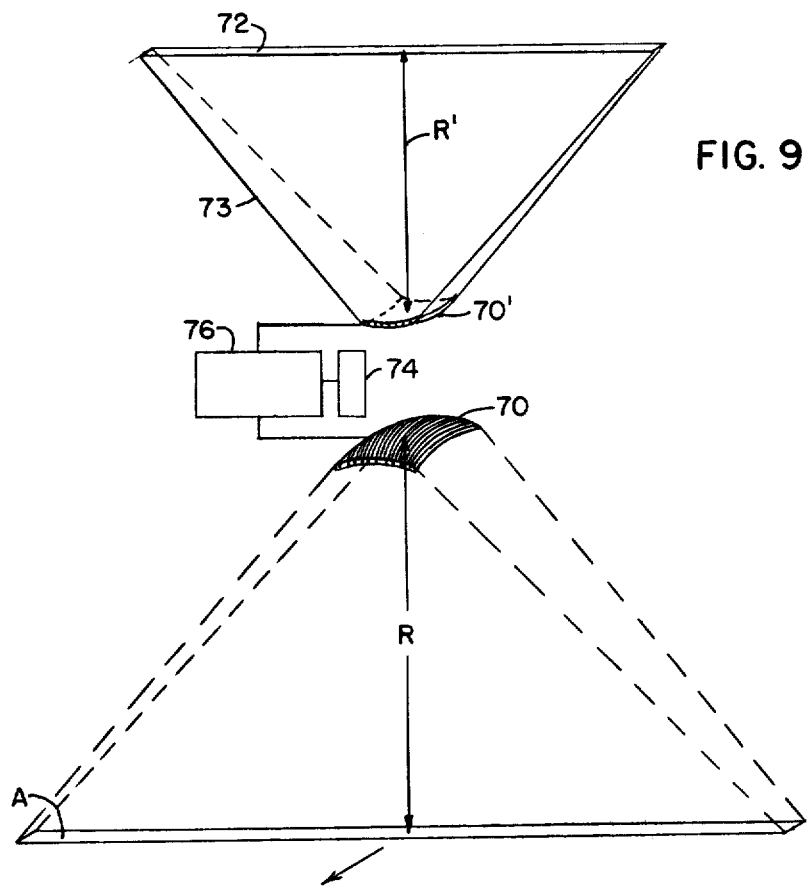
FIG. 9 illustrates a second underwater embodiment of the present invention.

FIG. 9 illustrates an arrangement which may be mounted on a carrier vehicle proceeding over a target area and wherein acoustic returns are received from a relatively narrow area on the bottom. The narrow area returns are stored and combined to yield a picture of the area over which the vehicle is traveling. The basic elements of the arrangement of FIG. 9 are the same as that previously described with respect to FIG. 1, however, the parameters, that is size, shape, etc. are different.

The array 70 includes a plurality of adjacent elongated narrow transducers each lying on the surface of an imaginary sphere of radius R where R is the distance to the target area A. The transducers of the array 70' are in a scaled relationship with those of array 7 and the transducers of array 70' lie on the surface of an imaginary sphere of radius R' where R' is the distance to the display 72 disposed at the other end of analog tank 73. As before, a transmitting means 74 projects acoustic energy toward the target area A and reflections therefrom are picked up by tthe transducers of array 70. The output signals therefrom are processed to change the amplitude, frequency and phase and are provided to the transducers of array 70'.

A typical system of FIG. 9 in operation may have the following parameters. Assume that the array 70 has 200 transducers each 300 centimeters long from tip to tip and each being of a width such that the total width of the array from side to side is also 300 centimeters. The distance to the target area is 1500 centimeters and the operating frequency is 50 kilohertz ($\lambda = 3$ centimeters). All of the transducers will look at a strip on the bottom of a dimension 3000 centimeters by 15 centimeters. Using a scaling factor of $S = 30$, the size of the array 70' will be 10 centimeters by 10 centimeters with the transducers operating at a frequency of 1.5 megahertz ($\lambda' = 0.1$ centimeters) and will be at a distance R' = 50 centimeters relative to the display 72. The display itself will be 100 centimeters by 0.5 centimeters.

Figure 11:
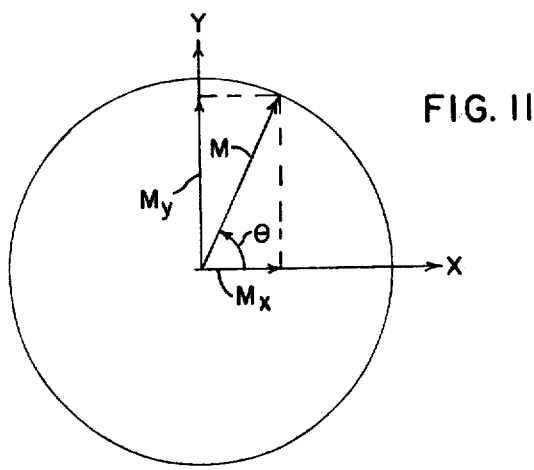
FIG. 11 is a vector diagram illustrating the components of a vector.
Figure 10:
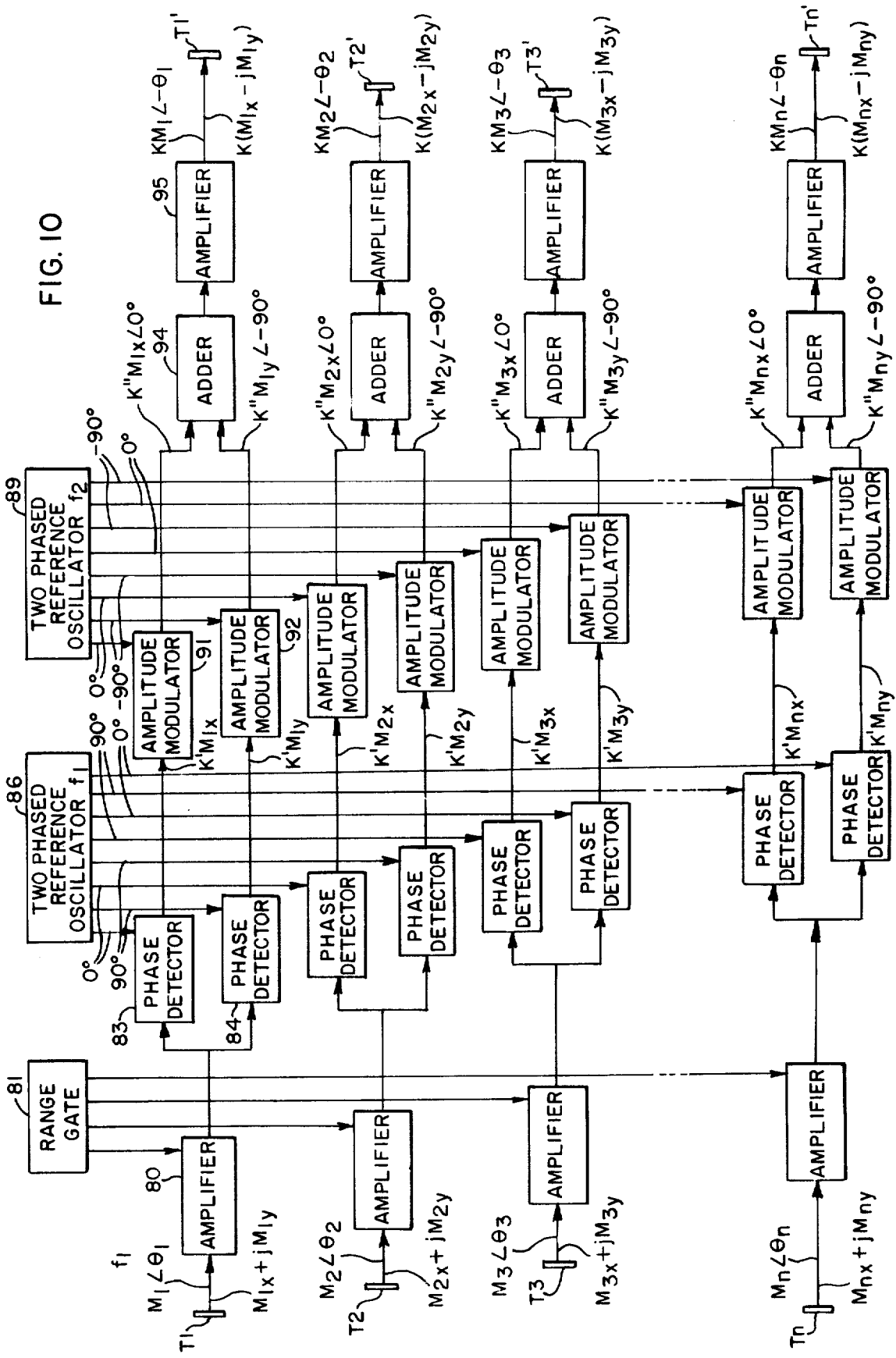
FIG. 10 illustrates another embodiment of a signal processing means.

The signal processing apparatus 76 may be like that previously described or could be any one of a number of other embodiments, one of which is illustrated in FIG. 10. The signal processing apparatus includes a plurality of channels each one connected between the respective transducers T1 to Tn of array 70 and T1' to Tn' of array 70'. Examining channel 1 as exemplary, the output of transducer T1 is designated $M_1$ at a phase angle $\theta_1$. In order to better understand the processing to be performed on this signal, reference should be made to FIG. 11 which illustrates in vector form a signal M at a certain phase angle $\theta$. The vector M may be separated into two mutually perpendicular components designated $M_x$ and $M_y$. In vector terminology therefore, another way of designating the signal $M_1 < \theta_1$ is $M_{1x} + jM_{1y}$ and is indicated at the output of T1 in FIG. 10. The signal is amplified in amplifier 80 which receives a turn-on signal from the range gate 81. The amplified signal is fed simultaneously to a pair of phase detectors 83 and 84 each of which receives a different output from the two-phased reference oscillator 86 which provides a signal of frequency $f_1$ at a zero phase to phase detector 83 and a signal of frequency $f_1$ at a 90° phase to phase detector 84.

As a result of this operation, phase detector 83 provides a DC signal proportional to the X component of the input signal and phase detector 84 provides a DC signal proportional to the Y component.

The scaled frequency $f_2$ is provided by the two phased reference oscillator 89 which provides a first output signal at a zero phase angle to amplitude modulator 91 and provides a second output signal at a phase angle of −90° to amplitude modulator 92. The result of this operation is such that the amplitude modulator 91 provides an output signal of a frequency $f_2$ and an amplitude proportional to $M_{1x}$ and having a zero phase angle. Amplitude modulator 92 provides an output signal of frequency $f_2$ proportional in amplitude to $M_{1y}$ at a −90° phase angle. These two components are added together in adder 94 and amplified by amplifier 95 the result being a signal equal to $KM_1 < -\theta_1$ which is provided to transducer T1'. The remaining channels operate on their respective signals in an identical manner to yield respective output signals proportional in magnitude to their input signals but of conjugate phase.

Each time the transmitter means 74 (FIG. 9) transmits an acoustic pulse, the energy returned from area A is processed and the array 70' will in turn transmit, portray on the display 72 any targets or portions thereof, in the area A.

With the dimensions given, the time for a transmitted signal to get to the area A and back to the array 70 is 0.02 seconds so a pule repetition rate of about 50 pulses per second is practical. The array can then move forward in the direction of the arrow an any speed up to about $$V = \frac{15 \text{ centimeters}}{0.02 \text{ seconds}} \times \frac{1 \text{ knot}}{51.5 \text{ centimeters/sec.}} = 14.5 \text{ knots.}$$

Figure 12:
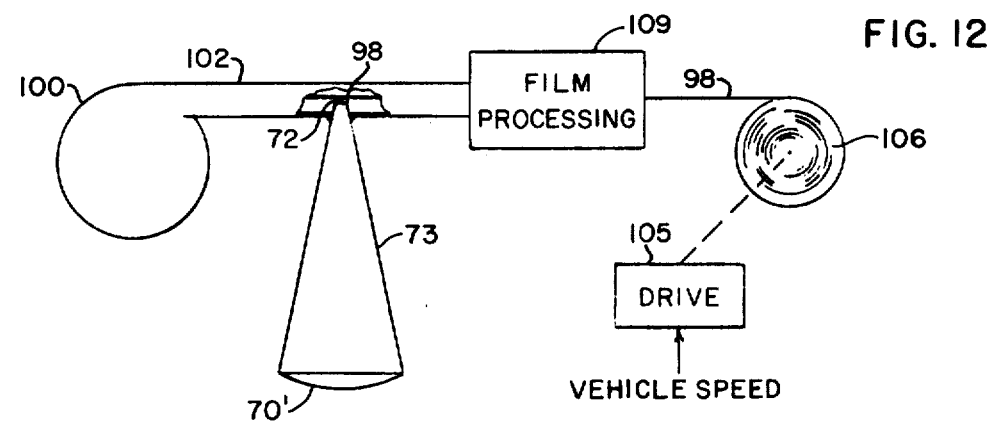
FIG. 12 illustrates an embodiment of a method for obtaining a permanent record of the target area as viewed by the apparatus of FIG. 9.

For each transmission therefore, the array 70' portrays a small strip of the bottom on the display 72. The display is extremely narrow, 0.5 centimeters, and would be more or less meaningless if one were simply to view the display. Accordingly, means are provided to store whatever information is on the display for each transmission. One way of accomplishing this is illustrated in FIG. 12 wherein the storage medium is a film 98 stored upon a roll 100 and contained within a light tight channel 102, broken away in FIG. 12 to show the relationship of the display 72 to the film 98, although in practice a lens for imaging the output onto the film or a fiber optic arrangement, could be used.

Each time the display 72 lights up, it prints a line of information on the film 98 and the film is indexed one line by the drive mechanism 105 driving a take-up roll 106. The drive mechanism 105 may be an indexing type of drive or a constant speed drive, the speed of which, if desired, may be governed by an input proportional to the vehicle speed.

After exposure, the film 98 is processed for development in the film processing section 109 and the physical distance of the take-up roll 106 from the film processing section 109 may be governed to permit viewing of the developed film.

In FIG. 10, a signal processing apparatus was described which separated a signal into two quadrature components $M_x$ and $M_y$. A satisfactory image can also be obtained by saving only one of the components of the received signal although there will be a reduction in signal to noise ratio. If the array is concave or nonplanar, a satsifactory reconstructed energy pattern will be formed in the analog tank and the sonic image converter will give an image of the target area. However, if the array is substantially flat, then a double image will be formed. This is analogous to the double image that is formed in a reconstruction of holographic images when a hologram is made by using a normal planar reference signal.

Figure 13:
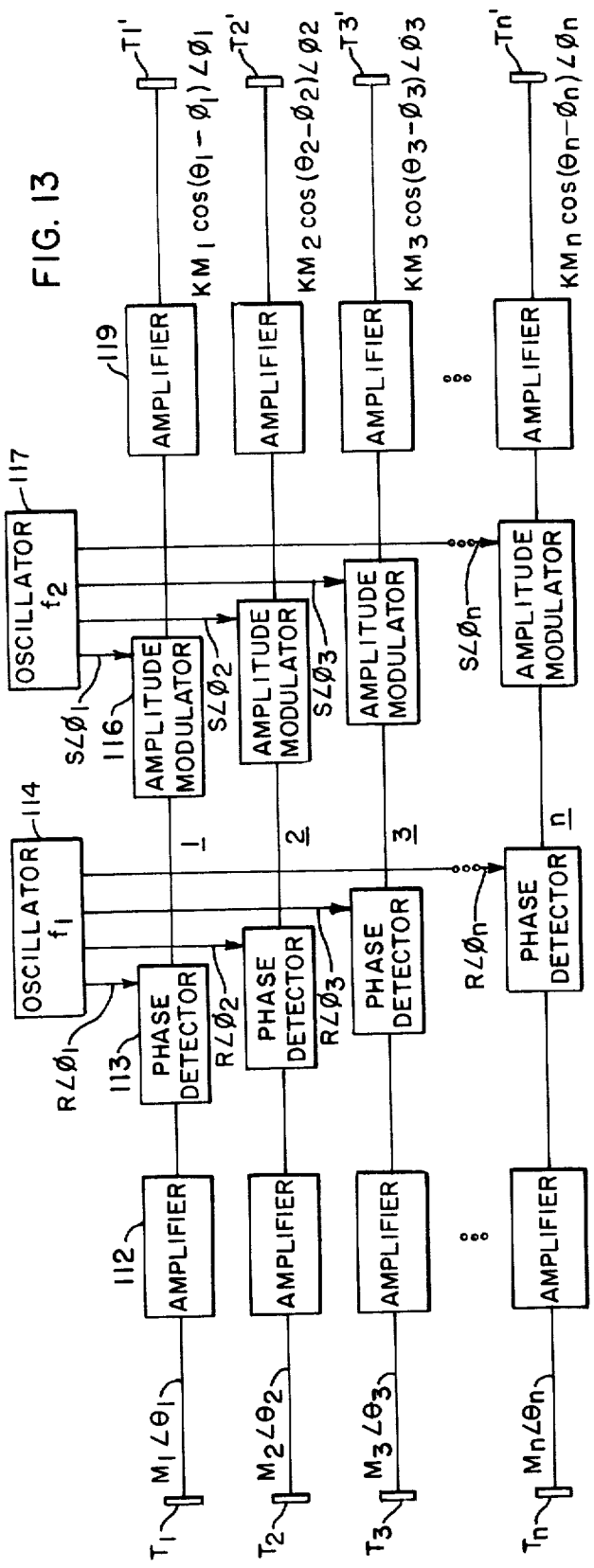
FIG. 13 illustrates another type of signal processing means.

It would be desirable to separate the two images so that only one falls on the image converter to be displayed. This can be done by an arrangement such as illustrated in FIG. 13 which includes a plurality of similar channels 1 to n each respectively processing a first output signal $M_1 < \theta_1$ to $M_n < \theta_n$ from transducers T1 to Tn. Taking channel 1 as exemplary, the input signal is amplified in amplifier 112 and provided to a phase detector 113 which receives a reference signal of frequency $f_1$ from oscillator 114, The phase of the oscillator signal however is progressively shifted for subsequent phase detectors in the other channels. For example, the phase of the reference signal to channel 1 may be 30° to channel 2, 60°, to channel 3, 90°, and to channel $n$, $n$ times 30°. The result of the operation yields a positive or negative DC signal which is fed to a subsequent amplitude modulator 116 which receives the output scaled frequency $f_2$ from oscillator 117 the phase of which signal however is progressively shifted for subsequent amplitude modulators in the remaining channels. The resultant signals are amplified in amplifiers 119 yielding second output signals to be provided to respective transmitting transducers T1' to Tn'. The resultant signals due to the processing are illustrated at the outputs of the respective amplifiers 119.

Figure 14:
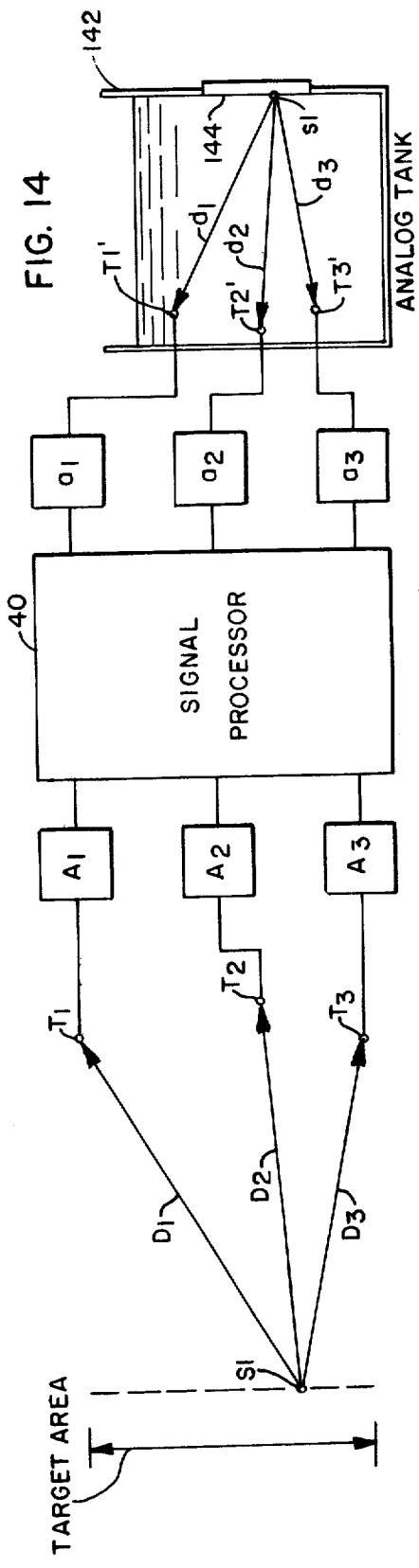
FIG. 14 illustrates another embodiment of the invention utilizing a magnetic signal processing.

Signal processing can also be accomplished by storage or magnetic recording techniques, and to this end, reference is made to FIG. 14. Let it be assumed that S1 is a source of acoustic energy or alternatively a reflector of energy impinging on it from some other source, point S1 being located on the target area under investigation. For simplicity, only three receiver transducers T1 to T3 are illustrated each being at a respective distance $D_1$ to $D_3$ from the source S1, where $D_1 > D_2$ and $D_2 > D_3$. The output signals from transducers T1 to T3, constituting first output signals, are amplified in respective amplifiers $A_1$ to $A_3$ and fed to signal processor 40, comprising a magnetic recording medium arrangement which records the first output signals on the magnetic recording medium at one rate and then reads the signals off backwards at a faster rate.

The second output signals from the signal processor 40 are provided to respective amplifiers $a_1$ through $a_3$ and then to respective transmitting transducers T1' to T3' in tha analog tank 142 containing, for example, water and having at one end thereof the image converter display 144.

The functional operation of the signal processor 40 may be illustrated with reference to FIG. 15 wherein waveform A illustrates an example of a pressure signal $P_s$ that might emanate from point S1, with respect to time. A pulse repetition period $T_0$ is given by way of example. Waveform B represents the output signal provided by transducer T1 starting at a time $t_1$ relative to waveform A. Waveform C illustrates the signal provided by transducer T2 occurring at a relative time $t_2$ and waveform D illustrates the output signal from transducer T3 at time $t_3$. These times $t_1$, $t_2$ and $t_3$ are proportional to the three distances $D_1$, $D_2$ and $D_3$. These three signals are recorded on, for example, a magnetic tape and then played back by a set of three read heads which move backwards across the tape at a greater speed relative to the tape than the write heads. Consequently, the output signals are scaled up in frequency and reversed in time as illustrated by the respective waveforms A through D in FIG. 16, with waveform A representing the pressure signal at point s1 at the display 144 due to the transmissions of respective signals of waveforms B, C and D from transducers T1', T2' and T3'.

Assuming a scale factor of 2, the transmitter transducer geometry will be a half scale replica of the receiving transducer geometry and the three signals as represented by waveforms B, C and D will all arrive at point s1 at the same time since $$d_1 = \left(\frac{D_1}{2}\right), d_2 = \left(\frac{D_2}{2}\right), \text{ and } d_3 = \left(\frac{D_3}{2}\right) \text{ and}$$

$$t_1 = \left(\frac{t_1'}{2}\right) \text{ and } t_2 = \left(\frac{t_2'}{2}\right) \text{ and } t_3 = \left(\frac{t_3'}{2}\right).$$

Although only three transducers were illustrated for clarity, it is to be understood that a typical embodiment would utilize hundreds of transducer elements and that more than one point source of acoustic energy or reflected energy would be present.

One form of magnetic tape signal processor is illustrated in FIG. 17 and includes a reel 150 of magnetic tape, for example, ½ inch to 6 inches wide, and driven at a constant rate by a capstan drive 152. (The conventional tensioning device is not illustrated.) As the tape 151 comes off of reel 150 it moves across a row of write heads 155, around a smooth rotating cylinder 157 and is wound up on a take-up reel 159. The rotating cylincer 157 contains a row of read heads 160 which rotate in a direction opposite to the motion of the tape. Consequently, the output signals are similar to the input signals but are periodically reversed in time and are multiplied in frequency. The speed of the tape 151 relative to the read heads 160 will be $F_s$ times the speed of the tape relative to the write heads 155. $F_s$ should be made equal to the scale factor of the analog tank utilized. The arc length covered by the tape 151 should be at least ($360°/F_s$) and in an active sonar implementation the transmitted sonar pulse rate should be synchronized with the rotation of the cylinder 157.

If no permanent record is desired than a single loop of magnetic tape may be utilized as illustrated in FIG. 18. A magnetic belt 167 passes around drums or cylinders 169 and 170. The magnetic belt 167 is driven by a capstan 172 in the direction shown by the arrows. There is no relative motion between the cylinder 169 and the magnetic belt 167. The cylinder 170 contains a row of read heads 174 and rotates in a direction opposite to the belt motion by a drive means, not illustrated. The signals are recorded by a row of write heads 177 and are removed by an erase head 179.

Another form of signal processing consists of mixing the first output signals to a higher frequency but retaining the same phases. The resulting signals are delayed by appropriate amounts and then are applied to the array of transmitting transducers. The delay units in effect act like a lens and as such the resultant display would not appear as in FIG. 1 but would appear as if one were viewing through a signal lens. Signals around the edge of the array require no delay but signals at the center have a maximum delay. This operation will become more apparent with reference to FIGS. 19, 20 and 21 to which reference is now made.

Figure 19:
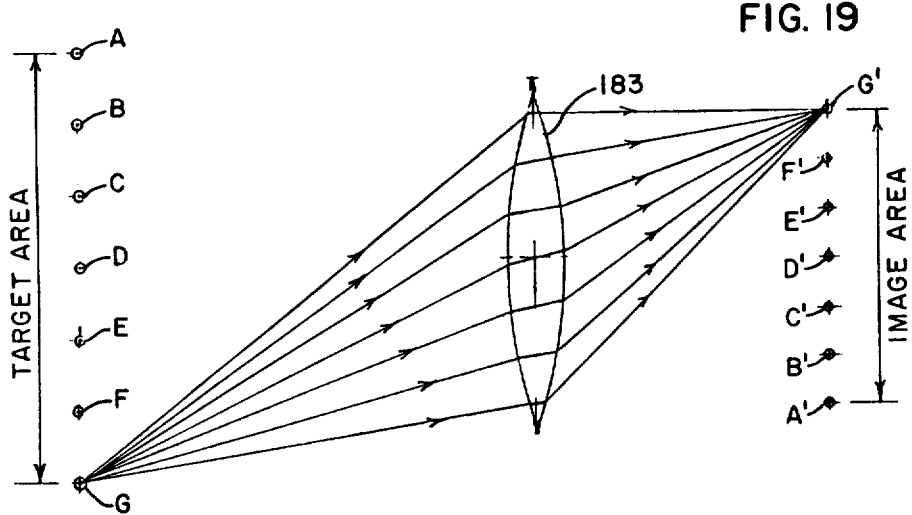
FIG. 19 basically illustrates the imaging of acoustic energy by a sonic lens.

FIG. 19 illustrates a basic acoustic lens imaging system utilizing an acoustic lens 183 of a material wherein the acoustic velocity is less than the acoustic velocity in water. The acoustic lens is utilized to focus energy from a set of points A to G in a target area onto a corresponding set of points A' to G' in the image plane of the lens. If an image coverter and display is placed at this image plane, then the distribution of acoustic energy will be visible. By rotating the display 180°, the target area maybe viewed as in FIG. 1 as opposed to the above mentioned single lens viewing. The points in the target area may generate acoustic energy or they may simply reflect acoustic energy that has been directed at them by a transmitting source.

Figure 20:
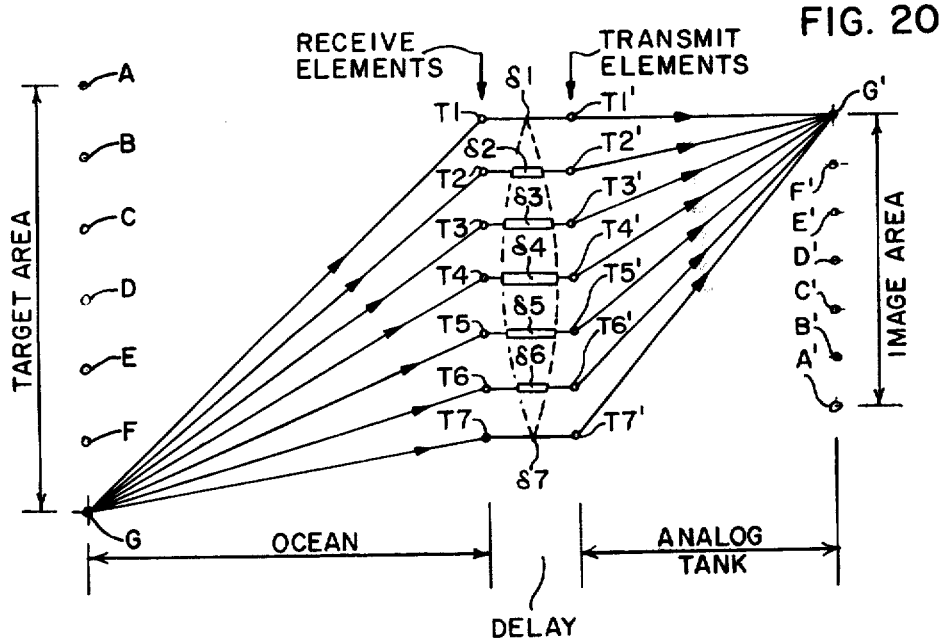
FIG. 20 illustrates an arrangement whereby the sonic lens is simulated by delay lines.
Figures 21, 22:
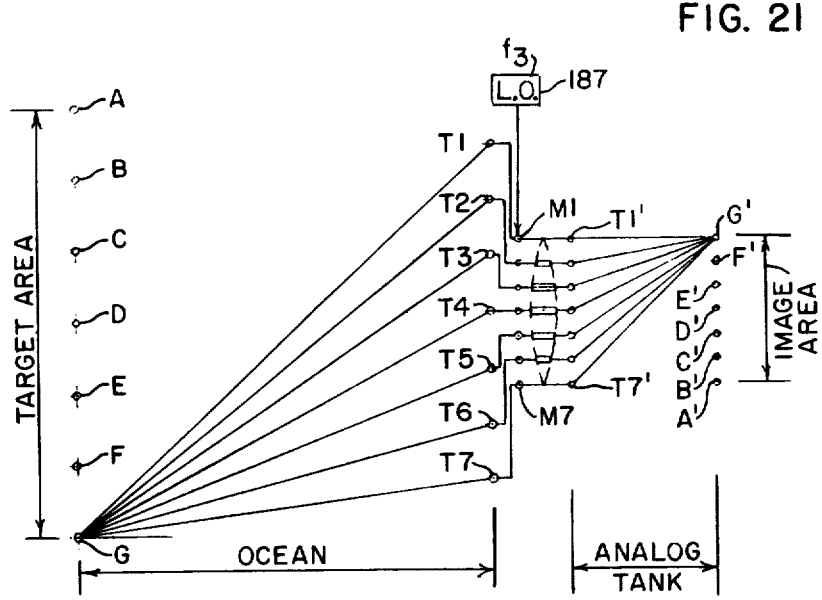
FIG. 21 is another embodiment of the present invention utilizing the principles of FIGS. 19 and 20.
FIG. 22 serves to illustrate a shading technique which may be utilized herein.

In FIG. 20, the acoustic lens 183 has been replaced by an array of receiving transducers T1 to T7, an array of transmitting transducers T1' to T7', and a plurality of delay lines $\delta 1$ to $\delta 7$. Since no delay is required at the periphery of the array, the delays $\delta 1$ and $\delta 7$ would be zero. At low frequencies, the size of the required analog tank could be excessively large so that the original signals should be mixed to a higher frequency and if done properly the phase information will remain unchanged. The resulting arrangement is illustrated in FIG. 21 which is similar to FIG. 20 however, with the addition of a plurality of mixers M1 to M7 for receiving the frequency $f_3$ from a local oscillator 187 to scale up the frequency of the signals transmitted by the transmittins transducers T1' to T7'. The dimensions of the analog tank therefore will be reduced by the scale factor employed and if desired power gain can also be provided in all the channels so that the acoustic energy at the image converter display is greater. The delay lines $\delta 1$ to $\delta 7$ that simulate the acoustic lens can be placed either before or after the mixers M1 to M7, however, less delay is required if they are placed in the scaled up frequency line.

The quality of the acoustic images produced by the analog tank processing method described herein can be improved by applying a shading function to the set of transmitted signals. This slightly decreases the obtainable resolution but greatly improves the quality of the image produced by the image converter. FIG. 22 illustrates an example of a set of shading values that could be used with an array of 89 square transducer elements. The number given in each square is the desired gain of each channel relative to the center channel. For example, the amplifiers feeding the 20 transducers around the edge of the array (those designated with a 25) would have 25% as much gain as the amplifier associated with the center element of the array.

In FIG. 23A there is illustrated an analog tank 190 of the same form as illustrated in FIG. 1 and including an array of transmitting elements 192 at one end of the tank and an output in the form of a converter and display 194 at the other end of the tank, with the walls of the tank being constructed of an acoustic absorbing material and the interior of the tank being filled with an acoustic transmission fluid such as water. In some instances, where the length of the tank would be long as compared to the diameter of the display, the physical size of the tank can be reduced by introducing one or more reflecting walls. For example, FIG. 23B illustrates an analog tank 196 with a single fold and including an acoustically reflecting surface 198 for directing acoustic energy from the transmitter array 192 to the display 194. The analog tank 200 of FIG. 23C includes two such reflections and two acoustic reflecting surfaces 202 and 203.

Figure 24:
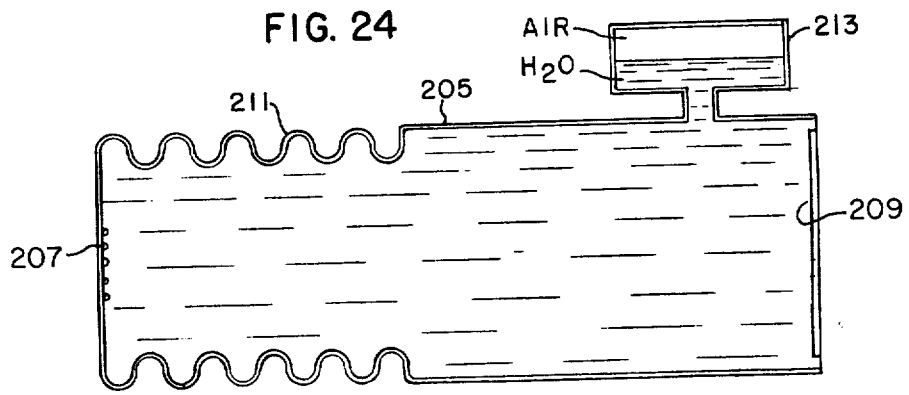
FIG. 24 illustrates an analog tank with variable focus.

For some operations it would be desirable for the imaging apparatus to be capable of producing clear images of objects at various ranges. In order to accomplish this, it is necessary to be able to change the distance from the transmitter array to the plane of the image converter-display. One way of accomplishing this is illustrated in FIG. 24 which shows an analog tank 205 having at one end thereof an array 207 of transmitting transducers and having at the other end thereof an output image converter 209. Means are provided for relatively moving the array 207 and converter 209 toward and away from one another, such as, by way of example, incorporation of a bellows arrangement 211. With the analog tank 205 being filled with an acoustic transmission medium such as water, there is provided an expansion tank 213 partially filled with the water in order to keep the analog tank full. The bellows arrangement also allows the transmitter array 207 to be tipped so that it is not parallel to the plane of the converter 209 so as to enable focusing on a target area that is not normal to the axis of the transducer array which receives the target area information.

Figure 25:
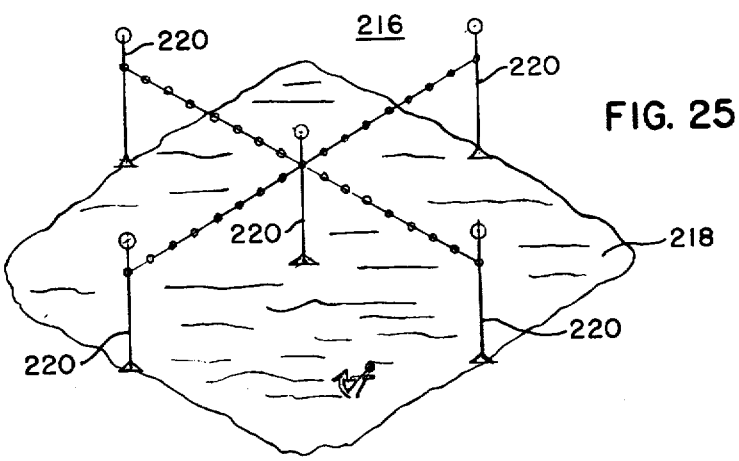
FIG. 25 illustrates an array of receiver elements for passive location of targets.

The principles of the present invention can be utilized in a passive array for determining the horizontal direction of a ship or submarine that is producing noise for example, in the 10 to 300 hertz region. FIG. 25 illustrates an array of receiving transducers 216 in the form of a cross, and disposed above the ocean bottom 218, and held in place by a series of anchors and floats 220.

Figure 26:
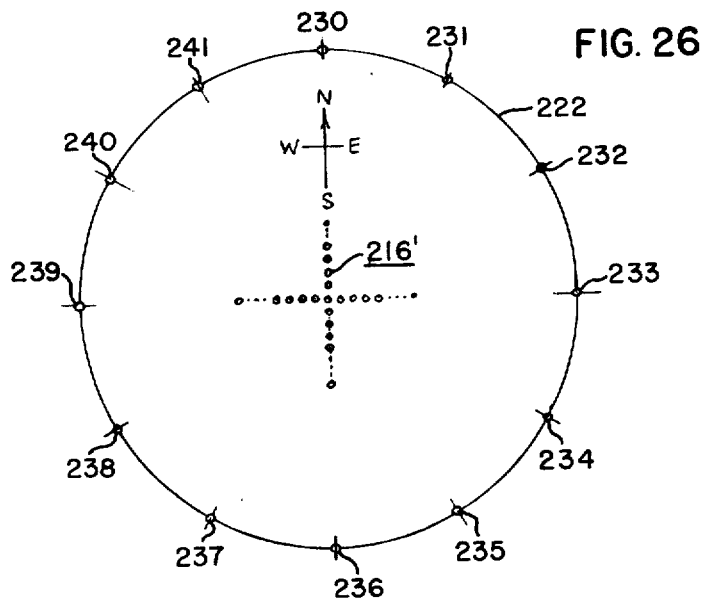
FIG. 26 illustrates a display which may be utilized with the array of FIG. 22.

Any signals provided by the transducers of the array in response to the reception of such noise are processed by one of the methods previously described to result in second output signals which are frequency scaled processed signals. The scaled signals are fed to respective transducers of a similar array 216', illustrated in FIG. 26, and located in a thin circular volume of liquid 222 (or solid). A ring of transducers 230 to 241 are connected to light sources or other indicating devices. If submarines for example, were located at +30° and +180° relative to north, then the indicators connected to transducers 231 and 236 would light. In practice, such line arrays may contain hundreds of elements and be thousands of feet long. If the array size is great enough to give 1° angular resolution then 360 pickup elements may be located at 1° intervals around the circumference of the circular volume 222.

The various analog tanks illustrated herein could be reduced in size by the utilization of liquids other than water. For example one could use a liquid with a lower acoustic velocity and wherein the wavelength of the acoustic energy would be shorter, Freon being one example.

Additionally even though the embodiments of the imaging system have been described with respect to an acoustic arrangement with a liquid in the analog tank, the techniques could also be used with electromagnetic energy and a gas or vacuum in the analog tank. It is also possible to process signals from an array of electromagnetic antenna elements and feed these to a shorter wavelength array of sonic transmitting elements located in a liquid analog tank or alternatively, process the signals from an acoustic array and feed them to electromagnetic transmitting elements in a gas or vacuum tank.

What is claimed is:

1. An imaging system comprising:
   A. a plurality of receiving elements for receiving energy from a target area to be viewed, for providing first output signals;
   B. a plurality of transmitting elements for transmitting energy;
   C. said receiving elements being arranged in a geometric array over a first predetermined surface;
   D. said transmitting elements being arranged in a similar, scaled geometric array over a second predetermined surface;
   E. said second predetermined surface being a similar scaled replica of said first predetermined surface;
   F. output means for receiving and displaying the energy pattern from said transmitting elements;
   G. signal processing means responsive to said first output signals and operable to process said first output signals to provide second output signals to said plurality of transmitting elements;
   H. said processing being operable to change said first output signals such that the energy distribution at said output means is a scaled replica of the energy distribution from said target area under investigation.

2. Apparatus according to claim 1 wherein said signal processing means includes:
   A. a plurality of similar channels each being connected between one of said receiving elements and one of said transmitting elements;
   B. said first output signals provided by said receiving elements each being of a certain amplitude, frequency and phase;
   C. circuit means in each channel operable to convert that channel's first output signal to a new signal of scaled amplitude, frequency and of conjugate phase.

3. Apparatus according to claim 2 wherein:
A. said new signal is said second signal and is of a higher frequency than said first signal.

4. Apparatus according to claim 2 wherein:
A. said new signal is said second signal and is of a greater amplitude than said first signal.

5. Apparatus according to claim 2 which includes:
A. transmitter means for projecting energy toward said target area;
B. said receiving elements receiving reflected energy as a result of said projection;
C. range gate circuit means for opening said channels to process said first output signals for a predetermined period of time after said projection.

6. Apparatus according to claim 2 wherein said circuit means includes:
A. an oscillator for providing an output signal of a frequency greater than the frequency of said first output signal;
B. a mixer connected for receiving said oscillator output signal and said first output signal and operable to provide an output comprised of a plurality of frequencies;
C. filter means for selectively passing a signal of only one of said frequencies;
D. and means for applying said selected signal to said transmitting element connected to that channel.

7. Apparatus according to claim 6 wherein:
A. said oscillator provides its output signal to the mixers of a plurality of channels.

8. Apparatus according to claim 2 wherein said circuit means includes:
A. means for separating said first output signal into first and second signals proportional respectively to the mutually perpendicular vector representation of said first output signal;
B. means including oscillator means for scaling the frequency and relative phase of said first and second signals and combining them to provide said new signal of scaled amplitude, frequency and of conjugate phase.

9. Apparatus according to claim 1 wherein said signal processing means includes:
A. a plurality of channels each being connected between one of said receiving elements and one of said transmitting elements;
B. said first output signals provided by said receiving elements each being of a certain amplitude, frequency and phase;
C. a phase detector and amplitude modulator for each said channel serially connected between a receiving and transmitting element;
D. a first reference oscillator for providing an output signal of a first frequency to the phase detector of a first of said channels, the phase of the oscillator signal being progressively shifted and applied to the phase detectors of subsequent channels;
E. a second reference oscillator for providing an output signal of a second frequency to the amplitude modulator of a first of said channels, the phase of the oscillator signal being progressively shifted and applied to the amplitude modulators of subsequent channels.

10. Apparatus according to claim 9 wherein:

A. said second frequency is a scaled frequency greater than the frequency of said first output signal.

11. Apparatus according to claim 1 wherein said signal processing means includes:
A. a storage medium;
B. means for recording said first output signals in said storage medium at a first rate;
C. means for reading said recorded signals out of said storage medium backwards at a second rate greater than said first rate.

12. Apparatus according to claim 11 wherein:
A. said storage medium is a magnetic recording medium; and which includes
B. a plurality of write heads each for recording a respective first output signal on said magnetic recording medium
C. drive means for moving said magnetic recording medium relative to said write heads;
D. a plurality of read heads each for reading a respective stored first output signal and moveable in a direction opposite to the movement of said magnetic recording medium.

13. Apparatus according to claim 1 wherein said signal processing means includes:
A. a plurality of signal delay lines interposed between selected receiving and transmitting elements;
B. the delay lines connected to receiving elements in the center of said array having relative maximum delay, said delay progressively decreasing with respect to delay lines connected to receiver elements from said center out toward the edge of said array.

14. Apparatus according to claim 13 which includes:
A. means for scaling up the frequency of each said first output signal.

15. Apparatus according to claim 14 which includes:
A. oscillator means for providing an output signal;
B. a plurality of mixers each connected in circuit between a receiver element and a transmitting element for receiving the output of said oscillator means to provide respective output signals of a frequency greater than the frequency of said first output signals.

16. Apparatus according to claim 15 wherein:
A. said mixers are connected between said receiver elements and said delay lines.

17. Apparatus according to claim 1 wherein said signal processing means includes:
A. a plurality of similar channels each being connected between one of said receiving elements and one of transmitting elements; and
B. means for applying selected shading values to the signals in said channels.

18. Apparatus according to claim 17 wherein:
A. the signals processed in said channels are amplified by amounts dependent upon the relative positioning in said array of the receiver element associated with the channel.

19. Apparatus according to claim 1 wherein:
A. the distance to the target area is R; and
B. said receiving elements lie on a segment of a spherical surface having a radius equal to R.

20. Apparatus according to claim 19 wherein:
A. the distance from said transmitting elements to said output means is R'; and
B. said transmitting elements lie on a segment of a spherical surface having a radius equal to R'.

21. Apparatus according to claim 1 which includes:
A. an analog tank having a signal transmission medium contained therein;
B. said transmitting elements being at one end of said analog tank,
C. said output means being at another end of said analog tank.

22. Apparatus according to claim 21 wherein:
A. said signal transmission medium is equivalent to the medium between said target area and said receiving elements.

23. Apparatus according to claim 21 wherein:
A. said transmitting elements are acoustic transducers; and
B. said signal transmission medium is a liquid.

24. Apparatus according to claim 21 wherein:
A. said analog tank includes at least one signal reflecting portion disposed in the energy path between said transmitting elements and said output means.

25. Apparatus according to claim 21 which includes:
A. means for moving said output means relative to said transmitting elements.

26. Apparatus according to claim 1 which includes:
A. an analog tank having a signal transmission medium therein,
B. said transmitting elements being within said analog tank; and which additionally includes
C. a plurality of transducers around said transmitting elements for receiving the energy transmitted thereby; and
D. a plurality of indicating devices connected to said plurality of transducers.

27. Apparatus according to claim 26 wherein:
A. said plurality of transducers are arranged in a plane at spaced angular positions.

28. Apparatus according to claim 26 wherein:
A. said indicating devices are lights.

* * * * *